United States Patent [19]

Butterworth et al.

[11] 4,415,318
[45] Nov. 15, 1983

[54] ROLLING THRUST BEARING FOR USE IN A SCROLL MACHINE

[75] Inventors: Arthur L. Butterworth; David H. Eber, both of La Crosse, Wis.

[73] Assignee: The Trane Company, La Crosse, Wis.

[21] Appl. No.: 329,148

[22] Filed: Dec. 10, 1981

[51] Int. Cl.³ .................. F01C 1/02; F01C 21/02; F16C 33/38; F16C 41/02
[52] U.S. Cl. .................................. 418/55; 308/235
[58] Field of Search ............... 418/55, 57; 308/230, 308/233, 235

[56] References Cited

U.S. PATENT DOCUMENTS

| | | | |
|---|---|---|---|
| 3,413,047 | 11/1968 | Levishko | 308/230 |
| 3,600,114 | 8/1971 | Dvorak et al. | 418/55 |
| 3,924,977 | 12/1975 | McCullough | 418/55 |
| 4,160,629 | 7/1979 | Hidden et al. | 418/55 |
| 4,259,043 | 3/1981 | Hidden et al. | 418/55 |

*Primary Examiner*—John J. Vrablik
*Attorney, Agent, or Firm*—Carl M. Lewis; Ronald M. Anderson; Raymond W. Campbell

[57] ABSTRACT

A rolling thrust bearing for use in a scroll type positive fluid displacement apparatus is disclosed. In the invention, a plurality of ball bearings spaced apart in cavities formed in a bearing cage are operative to transmit an axial force between a supporting frame and an orbiting scroll member. The bearing cage rotates within a groove in which it is seated due to frictional forces between its flank surfaces and the sides of the groove. In a first embodiment, the diameter of the cavities is substantially larger than the diameter of the ball bearings, and the bearings are free to orbit within the cavities as the bearing cage rotates. In the second embodiment, the cavities are only slightly larger in diameter than the ball bearings, but the radial width of the bearing cage is substantially less than the width of the groove, and the bearing cage and the ball bearings together describe an epicycloidal path about the central axis of the bearing cage. In both embodiments, the ball bearings seated within the cavities contact adjacent bearing races over a constanty changing portion of their surface. This substantially extends the operational life of the thrust bearing.

16 Claims, 7 Drawing Figures

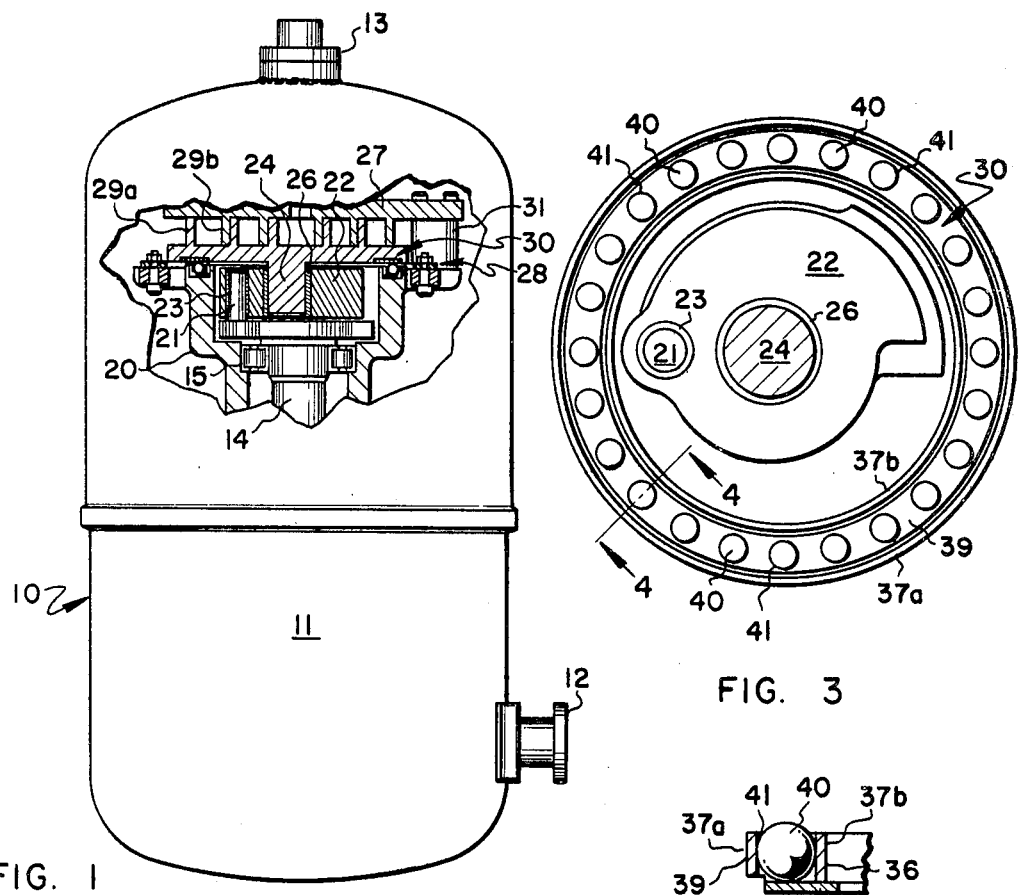
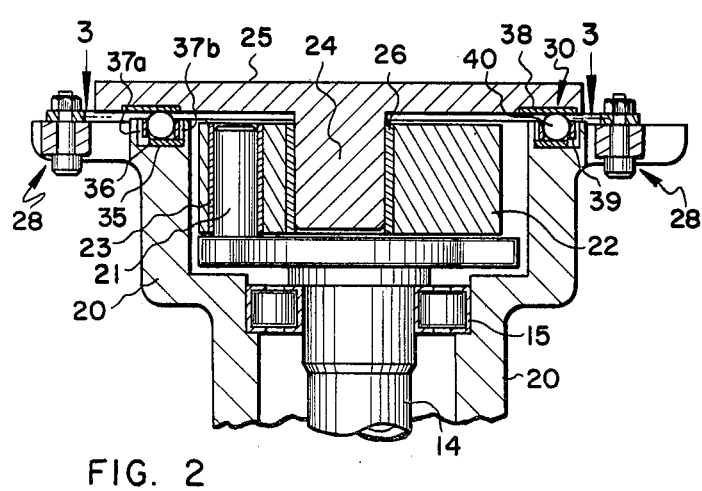
FIG. 1
FIG. 2
FIG. 3
FIG. 4

ROLLING THRUST BEARING FOR USE IN A SCROLL MACHINE

DESCRIPTION

Technical Field

This invention generally pertains to thrust bearings used in positive fluid displacement apparatus, and specifically to rolling type thrust bearings for use in such apparatus of the scroll type.

Background Art

Positive fluid displacement apparatus of the scroll type typically include parallel plates having involute wrap elements attached in intermeshed, fixed angular relationship. The axes of the wrap elements are normally parallel and offset such that their relative orbital motion causes pockets of fluid defined by flank surfaces of the wrap elements and the plates, to move between an inlet port and an outlet port.

Depending upon the configuration of the involute wrap elements and the relative direction of their orbital motion, a scroll machine may function as an expander (vacuum pump), a compressor, or a liquid pump. When used as an expander, the pockets of fluid moving through the machine originate near the center of the involutes and expand in volume as they move outward around the wraps. Conversely, in a scroll compressor, pockets of fluid move inward around the scroll wraps to a center discharge port, experiencing a substantial reduction of their volume in the process. In a liquid pump, each of the involute wraps makes only a single loop about the central axis such that pockets of liquid are not subjected to a significant change in volume as they are moved inward around the scroll toward a central discharge port.

In a scroll machine, it is important that the orbiting scroll be held in proper relation to the fixed scroll in the axial direction. In order to properly position the orbiting scroll element, the force applied thereto in the axial direction should at least equal the force developed by the fluid contained within the pockets defined by the involute wraps. Various means have been devised to maintain the axial relationship of the scroll elements, as for example, by applying a pressurized fluid from an external source to the back of the orbiting scroll plate (disclosed in U.S. Pat. No. 3,994,633), or in a more conventional approach, by using a thrust bearing comprising a sliding surface disposed on a supporting frame, as shown in U.S. Pat. No. 3,924,977. As noted in this patent, the sliding surface of such a thrust bearing requires substantial lubricant to minimize friction. The patent therefore suggests an alternative thrust bearing comprising rollers, noting that this reduces friction while requiring very little or no lubricant.

A further improvement to a thrust bearing for use in a scroll apparatus is shown in U.S. Pat. No. 4,259,043. A combination thrust bearing/coupling component for use in a scroll type apparatus is disclosed, which couples the stationary and orbiting scroll members in a predetermined fixed angular relationship, while carrying the axial loads sustained by the scroll members to achieve efficient sealing of the moving scroll fluid pockets. A plurality of circular spaced indentations are cut in one surface of an orbiting scroll member and in a facing surface of a fixed element, and spheres rolling within the indentations are used to carry the axial load. The rolling spheres are confined within the indentations cut within the facing surfaces and metal fatigue is confined to the orbital path along which the spheres roll within these indentations. Although this design reduces surface wear and friction as compared to the sliding type thrust bearing and combines two functions in one mechanism, it suffers from the drawback that the rolling spheres always travel over the same path within the indentations, repetitively subjecting the underlying surface to deformation with each orbit of the scroll element. Repetitive deformation of the metal comprising these surfaces may eventually result in fatigue and cracks in the grain structure of the metal. If the rolling spheres traverse a different path with each orbit of the scroll element, this problem can be reduced; however, since this thrust bearing also acts as a coupling element, the indentations must be provided to restrict the rolling sphere to the same circular path with each orbit of the scroll element.

In view of the above problems associated with the combination thrust bearing/coupling component, it is an object of the subject invention to provide a rolling thrust bearing in a scroll type positive displacement machine, wherein the bearing has an extended operational life.

It is a further object of this invention to reduce the frictional losses in a scroll type apparatus by eliminating the sliding thrust bearing.

It is still a further object of this invention to provide a thrust bearing for which a lubrication system is not critical, i.e., a bearing requiring little lubrication during its operation.

These and other objects of the invention will become apparent from the description of the preferred embodiments contained hereinbelow and by reference to the attached drawings.

DISCLOSURE OF THE INVENTION

A positive fluid displacement apparatus of the scroll type is disclosed comprising a fixed and an orbiting scroll member, each including a plate having an involute wrap element attached thereon in fixed angular intermeshed relationship with the other. Contacting surfaces of these plates and wrap elements define pockets of fluid. The orbiting scroll member is driven so that its involute wrap element describes an orbital path about an axis, relative to the involute wrap element of the fixed scroll member. The apparatus also includes a supporting frame in which an annular groove is formed about a central axis which is parallel to the axis of the orbiting scroll member and has a radially inner and outer side wall extending in the axial direction. A fixed bearing race is disposed within the groove and provides a substantially flat surface between the side walls.

An orbiting bearing race of generally flat annular shape is disposed on the plate of the orbiting scroll member opposite that side on which its involute wrap element is attached. The orbiting bearing race is opposite and substantially parallel to the fixed bearing race and faces into the groove, toward it. Within the groove, between the facing surfaces of the fixed and orbiting bearing races is disposed a bearing cage having a generally annular shape, which is free to rotate about the axis of the groove. The bearing cage includes a plurality of spaced cavities formed therethrough in the axial direction, all of which lie on a circle about the groove axis and open to the adjacent facing surfaces of the fixed and orbiting bearing races.

A plurality of ball bearings are disposed within the cavities of the bearing cage and are retained therein. The ball bearings are in contact with the facing surfaces of the orbiting and fixed bearing races and thereby are operative to transmit an axial force from the supporting frame to the orbiting scroll member, so that the orbiting and fixed involute wrap elements are respectively axially loaded against the plate toward which they face in sealing relationship. Since the bearing cage is at least intermittently in contact with the inner and/or outer sidewalls of the groove, the frictional drag thereagainst causes it to rotate about its central axis as the orbiting scroll member orbits. The rolling bearings therefore contact the fixed and orbiting bearing races over a distributed surface area, extending the operational life of the thrust bearing.

In one embodiment of the invention, the cavities in the bearing cage are only slightly larger in diameter than the ball bearings, and the radial width of the bearing cage is substantially less than the radial width of the groove, measured between its sidewalls. As a result, the bearing cage and ball bearings describe an epicycloidal path about the axis of the groove between its sidewalls, as the bearing cage rotates and the ball bearings roll within the cavities.

In a second embodiment, the cavities in the bearing cage are substantially larger in diameter than the ball bearings and the radial width of the bearing cage is only slightly less than the radial width between the groove sidewalls. Thus, the ball bearings describe an epicycloidal path about the axis of the groove, while orbiting within the cavities as the bearing cage rotates.

BRIEF DESCRIPTION OF THE DRAWINGS

FIG. 1 shows a cutaway view of the subject invention in a scroll compressor application.

FIG. 2 is an enlarged cross-sectional view of the first embodiment of the thrust bearing, showing how it is disposed between the orbiting scroll element and the supporting framework of the compressor.

FIG. 3 is a cross-sectional view taken along section line 3—3 of FIG. 2, and illustrates the bearing cage and ball bearings of the bearing in plan view.

FIG. 4 is a cross-sectional view along section line 4—4 of FIG. 3 showing a ball bearing and the cavity within which it is retained in the bearing cage.

DESCRIPTION OF THE PREFERRED EMBODIMENTS

Figure 5:
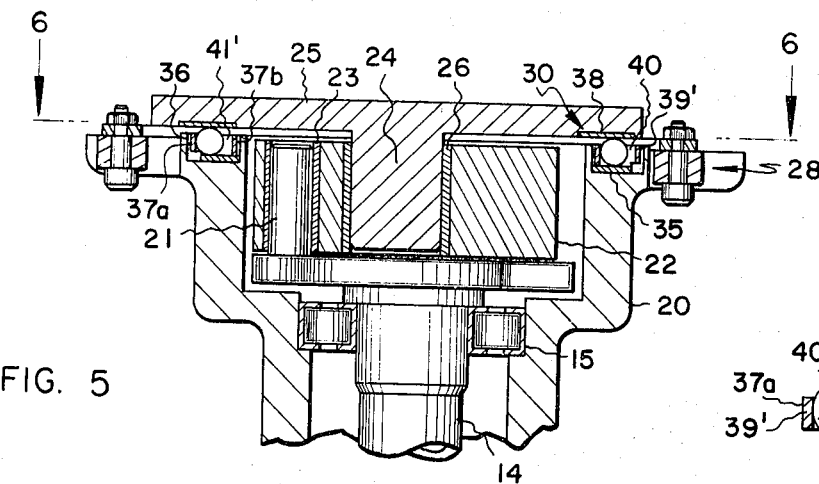
FIG. 5 is a cross-sectional view analogous to that of FIG. 2, showing the second embodiment of the subject invention, wherein the ball bearings orbit within the substantially larger cavities of the bearing cage.

Referring to FIG. 1, a scroll machine configured for use as a refrigerant compressor is generally denoted by reference numeral 10. Scroll compressor 10 includes a hermetic shell 11 through which refrigerant vapor may enter by means of a suction port 12, and fluid compressed therein may exit by means of discharge port 13. The lower portion of the hermetic shell 11 houses an electric motor (not shown) of generally conventional type which serves to rotate a drive shaft 14. The upper end of drive shaft 14 is centered within the hermetic shell 11 by roller bearing 15, seated in a supporting frame 20. Connected to the top of drive shaft 14 and offset from its longitudinal axis is a crank pin 21 which engages a swing link 22. Crank pin 21 is adapted to pivot within journal bearing 23 as drive shaft 14 rotates in a counterclockwise direction as viewed from above.

A drive stud 24 is attached to the lower surface of an orbiting scroll plate 25 and is seated in journal bearing 25 within swing link 22. The longitudinal axis of drive stud 24 is also offset from the longitudinal axis of drive shaft 14. As drive shaft 14 rotates, swing link 22 translates the rotational motion of crank pin 21 about the longitudinal axis of shaft 14 into an orbital motion by the center of drive stud 24 about that axis. Swing link 22 has a lobular shape, with its center of mass displaced to one side of the axis of drive stud 24 so that it develops a centripetal force tending to offset a portion of the centrifugal force developed by the orbiting scroll plate 25. Swing link 22 thus comprises linkage of the radially compliant type. An alternative radially compliant means for linking a driving mechanism to an orbiting scroll member is disclosed in U.S. Pat. No. 3,924,977.

Parallel to and facing toward orbiting scroll plate 25 is a fixed scroll plate 27. Orbiting scroll plate 25 is constrained to orbit in a fixed angular relationship relative to fixed scroll plate 27 by means of an Oldham coupling, generally denoted by reference numeral 28. The Oldham coupling 28 is a sliding block mechanism well known to those skilled in the art. It should be noted that prior art U.S. Pat. No. 4,259,043 discloses scroll apparatus which does not include an Oldham coupling, but rather relies upon the thrust bearing assembly having ball bearings confined within indentations to couple the orbiting and fixed scroll members in fixed angular relationship. In contrast, scroll compressor 10 uses a rolling thrust bearing, but includes a generally conventional Oldham coupling for reasons which will be explained hereinbelow.

On the facing surfaces of orbiting scroll plate 25 and fixed scroll plate 27 are involute wraps 29a and 29b, respectively, in intermeshed relationship. The axes of the involute wraps 29a and 29b are parallel and offset such that their relative orbital motion causes pockets of fluid defined by the surfaces of the involute wraps 29 and the facing surfaces of orbiting scroll plate 25 and fixed scroll plate 27, to move from the radially outer end of the involute wraps 29 to their radially inner end. The pockets of fluid moving around involute wraps 29 experience a substantial reduction of their volume and are thus compressed prior to discharge through port 13, as previously noted.

Since it is important that fluid leakage past the tips of involute wraps 29 be controlled to compress the fluid, a substantial net axial force must be provided against the orbiting scroll plate 25. For this purpose, a thrust bearing generally denoted by reference numeral 30 transmits force from the supporting frame 20 to the orbiting scroll plate 25. The fixed scroll plate is held in position to resist this axial force by means of spaced apart blocks 31. Thrust bearing 30 transmits this axial force with minimal friction and with little requirement for lubrication, by allowing relative movement of the surfaces with little or no sliding action.

Turning now to FIGS. 2-4, the first embodiment of thrust bearing 30 is shown in greater detail. Thrust bearing 30 comprises a fixed bearing race 35 seated in the bottom of an annular groove 36 formed within the supporting frame 20 adjacent the undersurface of the orbiting scroll plate 25. Groove 36 includes sidewalls 37a and 37b which are parallel to the longitudinal axis of drive shaft 14. The facing surface of the orbiting scroll plate 25 also includes an orbiting bearing race 38 of generally annular shape, conforming in size to that of the fixed bearing race 35. Bearing races 35 and 38 are formed of hardened steel to provide extended life. Neither fixed bearing race 35 nor orbiting race 38 include any indentations, but rather are substantially flat and parallel to each other. A bearing cage 39 is seated within groove 36 between sidewalls 37a and 37b. Bearing cage 39 has a plurality of ball bearings 40 seated within cavities 41 at spaced apart intervals. In the first embodiment, the diameter of cavities 41 is only slightly larger than that of the ball bearings 40, providing sufficient clearance, i.e., a clearance of approximately 0.1 millimeter or less, so that ball bearings 40 are free to rotate within cavities 41 with minimal friction. Ball bearings 40 contact the fixed bearing race 35 on one side and the orbiting bearing race 38, diametrically opposite thereto. The axial force applied through the orbiting scroll plate is thus transmitted to each of the ball bearings 40.

The width of bearing cage 39 as measured in the radial direction around the longitudinal axis of drive shaft 14 is substantially less than the width of groove 36. The difference in their widths is approximately equal to one-half the diameter of the orbit described by orbiting scroll plate 25. Ball bearings 40 and bearing cage 39 together describe an epicycloidal motion around the longitudinal axis of drive shaft 14 as ball bearings 40 rotate. The orbital motion of rolling ball bearings 40 and bearing cage 39 continually brings one or both of the radially exterior surfaces (or flank surfaces) of bearing cage 39 into contact with groove sidewalls 37a and 37b. The frictional force between these surfaces causes the bearing cage to rotate in a direction opposite to the direction in which orbiting scroll plate orbits around the longitudinal axis of drive shaft 14. Rotation of bearing cage 39 about this axis causes ball bearings 40 to roll over a continually changing portion of the fixed bearing race 36 and the orbiting bearing race 38, in an epicycloidal motion.

The surface of the bearing races 35 and 38 which ball bearings 40 contact is subjected to elastic deformation. However, since the path of the ball bearings continually changes with each rotation of drive shaft 14, that deformation occurs over a distributed surface area of the bearing races. This results in a substantial improvement over the rolling thrust bearing of the prior art as represented by U.S. Pat. No. 4,249,043, wherein the ball bearings continuously roll over the same circular path within constraining indentations. Repetitive deformation of the same portion of the bearing race surface, as in the prior art, eventually may result in cracks forming in the granular structure of the metal comprising the bearing races, resulting in spalling of the surface and subsequent failure of the bearing. Thrust bearing 30 substantially reduces this problem by distributing the elastic deformation and its undesirable effects over a continuously changing portion of the bearing races 35 and 38. This greatly extends the operating life of the thrust bearing.

Figure 7:
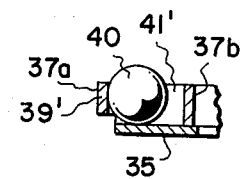
FIG. 7 is a cross-sectional view of one of the ball bearings and the cavity within which it is retained, taken along section line 7—7 of FIG. 6.
Figure 6:
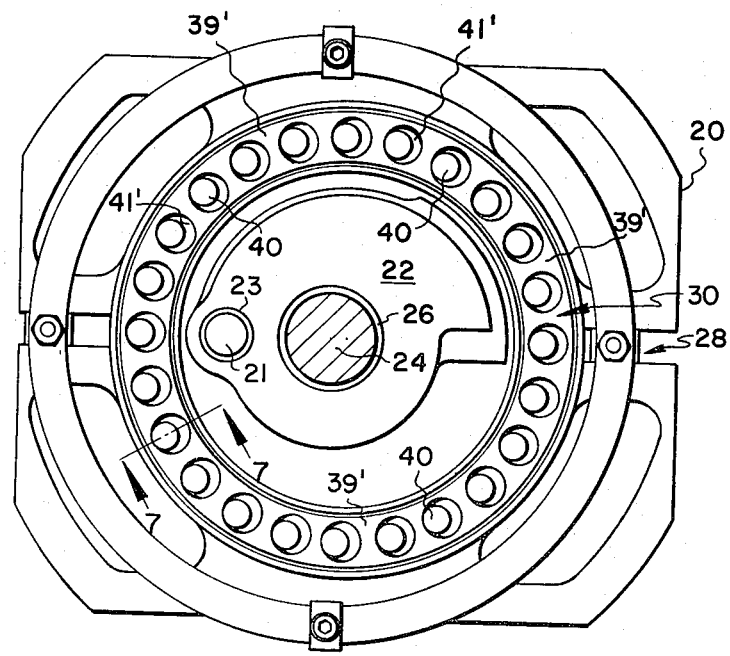
FIG. 6 is a cross-sectional view taken along section line 6—6 of FIG. 5, illustrating in plan view the second embodiment of the thrust bearing.

With reference to FIGS. 5–7, a second embodiment of the thrust bearing 30 is disclosed wherein a bearing cage 39' includes cavities 41' which are substantially larger in diameter than ball bearings 40. The second embodiment further differs from the first embodiment in that bearing cage 39' is wider in the radial direction than is bearing cage 39, being only slightly less than the width of groove 36. All other components of scroll compressor 10 are generally the same in the first and second embodiments, and are therefore identified by the same reference numerals. Bearing cage 39' is also operative to rotate in a direction opposite to that of orbiting scroll plate 25, as a result of frictional force between the flank surfaces of bearing cage 39' and the sidewalls 37a and 37b of groove 36. The diameter of cavities 41' is approximately equal to the sum of one-half the diameter of the orbit described by orbiting scroll plate 25, and the diameter of the balls, so that ball bearings 40 describe a circular motion within cavities 41' as drive shaft 14 rotates. The combined circular path of ball bearings 40 and the rotation of bearing cage 39' again causes ball bearings 40 to describe an epicycloidal path. Ball bearings 40 thus contact the fixed bearing race 35 and orbiting bearing race 38 along a continuously changing path so that elastic deformation of the underlying material is distributed widely over the surface area of the bearing races to extend their operational life.

Although groove 36 is shown in both preferred embodiments as being formed in the supporting frame 20, it might also be formed instead within the facing surface of orbiting scroll plate 25. Likewise, this invention may be used in other configurations of a scroll machine such as pump or expander.

While the subject invention has been described with respect to the preferred embodiments, it is to be understood that further modifications thereto would be apparent to those skilled in the art, which modifications lie within the scope of the present invention as defined in the claims which follow.

We claim:

1. In a positive fluid displacement apparatus of the scroll type, including an orbiting scroll plate having an attached involute wrap element, a thrust bearing comprising a. a supporting frame;
 b. a first and second bearing race, disposed respectively on the supporting frame and on a side of the orbiting scroll plate opposite the wrap element, each bearing race being of generally angular shape, having substantially flat, parallel surfaces facing toward each other, said facing surfaces moving in planar orbital motion relative to each other;
 c. a bearing cage of generally annular shape disposed between the first and second bearing races and confined within an annular formation having at least one sidewall adjacent one of the first and second bearing races, said bearing cage being free to rotate about a central axis within said annular formation, and including a plurality of spaced cavities having their centers on a circle about the axis and opening onto the adjacent facing surfaces of the first and second bearing races; and
 d. a plurality of ball bearings disposed within said cavities, describing orbital paths while in rolling contact with the first and second bearing races and thereby operative to transmit an axial force from the supporting frame as the first and second bearing races orbit relative to each other, said bearing cage being operative to rotate about its axis due to frictional forces resulting from the bearing cage at least intermittently coming into contact with a sidewall of the annular formation in which it is confined so that the ball bearings disposed in the cavities contact the first and second bearing races over a distributed surface area thereof, thereby extending the operational life of the thrust bearing.

2. In a positive fluid displacement apparatus of the scroll type including a driven orbiting and a fixed scroll member, a thrust bearing comprising
   a. a supporting frame;
   b. a fixed bearing race of generally flat annular shape disposed within a groove including at least one sidewall formed in the supporting frame;
   c. an orbiting bearing race of generally flat annular shape disposed on the orbiting scroll member on a side where it is driven, opposite and substantially parallel to the fixed bearing race, in facing relationship therewith;
   d. a bearing cage of generally annular shape, free to rotate about its central axis, disposed between facing surfaces of the fixed and the orbiting bearing races, said bearing cage including a plurality of spaced cavities formed therethrough, each having a center point lying on a circle about the axis of the bearing cage and open to the adjacent facing surfaces of the fixed and the orbiting bearing races; and
   e. a plurality of ball bearings disposed within said cavities of the bearing cage, each in contact with the facing surfaces of the orbiting and the fixed bearing races, and thereby operative to transmit an axial force from the supporting frame to the orbiting scroll member on which the orbiting race is disposed, said bearing cage being operative to rotate about its central axis as the orbiting scroll member orbits due to frictional forces resulting from the bearing cage at least intermittently coming into contact with a sidewall of the groove in which it is confined, so that the rolling ball bearings contact the fixed and orbiting bearing races over a distributed surface area thereof, thereby extending the operational life of the thrust bearing.

3. The thrust bearing of claim 1 or 2 wherein the cavities in the bearing cage are slightly larger than the diameter of the ball bearings, and both the bearing cage and ball bearings describe an epicycloidal path as the bearing cage rotates about its axis and the bearings rotate within the cavities.

4. The thrust bearing of claim 3 wherein the ball bearings roll along a moving circular path having a diameter equal to approximately one-half the diameter of the orbits of the bearing races.

5. The thrust bearing of claim 1 or 2 wherein the cavities in the bearing cage are substantially larger than the ball bearings, and the ball bearings describe an epicycloidal path while they orbit within the cavities as the bearing cage rotates.

6. The thrust bearing of claim 5 wherein the ball bearings rotate along a moving circular path as the bearing cage rotates, and the diameter of the circular path is approximately equal to one-half the diameter of the orbit of the bearing races.

7. The thrust bearing of claim 1 or 2 wherein the bearing races are hardened metal.

8. The thrust bearing of claim 1 or 2 wherein the cavities in the bearing cage are generally of cylindrical shape.

9. A positive fluid displacement apparatus of the scroll type comprising a. a fixed scroll member and an orbiting scroll member, each including a plate having an involute wrap element attached thereon in fixed angular intermeshed relationship with each other, contacting surfaces of said plates and wrap elements defining pockets of fluid;
   b. means for driving the orbiting scroll member so that its involute wrap element describes an orbital path about an axis, relative to the involute wrap elment of the fixed scroll member;
   c. a supporting frame in which an annular groove is formed about a central axis which is parallel to the axis of the orbiting scroll member, said groove having a radially inner and outer sidewall extending in the axial direction;
   d. a fixed bearing race disposed within the groove and providing a substantially flat surface between said sidewalls;
   e. an orbiting bearing race of generally flat annular shape, disposed on the plate of the orbiting scroll member opposite that side on which its involute wrap element is attached, said orbiting bearing race being opposite and substantially parallel to the fixed bearing race and facing into the groove theretoward;
   f. a bearing cage of annular shape, disposed within said groove between facing surfaces of the fixed and orbiting bearing races and free to rotate about the axis of the groove, said bearing cage including a plurality of spaced cavities formed therethrough in the axial direction, all lying on a circle about the groove axis and open to the adjacent facing surfaces of the fixed and the orbiting bearing races;
   g. a plurality of ball bearings disposed within said cavities of the bearing cage and retained therein, each in contact with the facing surfaces of the orbiting and fixed bearing races, and thereby operative to transmit an axial force from the supporting frame to the orbiting scroll member so that the orbiting and fixed involute wrap elements are axially loaded against the plate toward which they face, in sealing relationship, said bearing cage being at least intermittently in contact with one of the inner or outer sidewalls of the groove so that frictional drag thereagainst causes it to rotate about its central axis as the orbiting scroll member orbits, whereby the rolling ball bearings contact the fixed and orbiting bearing races over a distributed surface area thereof, extending the operational life of the thrust bearing.

10. The apparatus of claim 9 wherein the cavities in the bearing cage are only slightly larger in diameter than the ball bearings, the radial width of the bearing cage is substantially less than the radial width between the groove sidewalls, and the bearing cage and ball bearings describe an epicycloidal path about the axis of the groove between its sidewalls as the bearing cage rotates and the ball bearings roll within the cavities.

11. The apparatus of claim 10 wherein the ball bearings roll along a moving circular path having a diameter equal to approximately one-half the diameter of the orbit of the orbiting scroll member.

12. The apparatus of claim 9 wherein the cavities in the bearing cage are substantially larger in diameter than the ball bearings, the radial width of the bearing cage is only slightly less than the radial width between the groove sidewalls, and the ball bearings describe an epicycloidal path about the axis of the groove while orbiting within the cavities as the bearing cage rotates.

13. The apparatus of claim 12 wherein the ball bearings rotate along a moving circular path as the bearing cage rotates, and the diameter of the circular path is approximately equal to one-half the diameter of the orbit of the orbiting scroll member.

14. The apparatus of claim 9 wherein the bearing races are hardened metal.

15. The apparatus of claim 9 wherein the cavities are generally of cylindrical shape.

16. The apparatus of claim 9 wherein the bearing cage rotates in a direction opposite to the direction in which the orbiting scroll member orbits.

* * * * *